United States Patent

[11] 3,587,077

[72] Inventors Andrew Ferdinand Kaldor
16 Young Street, Vaucluse;
Stellema Lammert, 19 Reservior Road,
Blacktown, both of, New South Wales,
Australia

[21] Appl. No. 754,210
[22] Filed Aug. 21, 1968
[45] Patented June 22, 1971
[32] Priority Aug. 23, 1967
[33] Australia
[31] 26,285/67

[54] TELEMETRY SYSTEMS
4 Claims, 17 Drawing Figs.

[52] U.S. Cl. .......... 340/202, 340/152 T
[51] Int. Cl. .......... G08c 15/12
[50] Field of Search .......... 340/202, 152 T, 152

[56] References Cited

UNITED STATES PATENTS 2,468,703 4/1949 Hammel .......... 340/206
3,483,327 12/1969 Schwartz .......... 340/202

*Primary Examiner*—Thomas B. Habecker
*Attorney*—Waters, Roditi, Schwartz & Nissen

ABSTRACT: Telemetry equipment for use in an Audience Survey System for ascertaining at a central control the program channels to which wave signal receivers are tuned at a plurality of remote preselected locations, comprising a single transmission path between the control and remote locations, an interrogation transmitter at the control center, a carrier frequency for transmission from the central control, sources of audio tones, means for grouping two or more of the tones to modulate the carrier, a different grouping of the tones being assigned to be representative of individual wave signal receivers, a transceiver at each remote location for receiving the modulated carrier, means for detecting the modulating tones thereat to initiate transmission of a reply from a respectively remote location which corresponds to the grouping of the modulating tones, means for modulating the reply signal to indicate the program to which the wave signal receiver is tuned at the remote location, and detection means at the central control for deriving from each received reply signal an indication of the tuning of the respective wave signal receiver.

TELEMETRY SYSTEMS

This invention relates to Telemetry Systems and particularly to those serving to signal several different conditions prevailing at remote positions.

An elementary form of Telemetry System presently in use provides for continuous transmission of a carrier wave from a remote station which is modulated with a signal representative of a measurement or condition existing at the remote station. In more sophisticated examples of telemetry apparatus provision is made for information as to one of several conditions prevailing or occurring at two or more remote stations to be signalled to a central location. The necessary equipment, however, is complicated.

A typical application of a system falling within the latter category is where a statistical record is required of a prevailing one of several conditions at each of a large number of stations. Such a record is required to be kept in a Television Program Selection Analyzing System from which it is possible to estimate the number of television sets tuned to any program. By appropriate selection of the television viewers a reasonably accurate general opinion poll may be obtained.

Electrical apparatus now available for obtaining a record of the almost instantaneous tuning of commercial receivers in a sampled area, comprises a central control unit transmitting an interrogating signal in an initial time slot in a predetermined interval of time while remote transponder units at the commercial receivers reply in different individual time slots of the time interval. Control and synchronism for the system is provided by rotary switches and driving motors located at the central control and all remote transponder units. As a minimum of several hundreds of receivers require sampling simultaneously the rotary switches contain a corresponding number of contacts and require to be precision constructed. Furthermore many moving mechanical parts are employed at each transponder unit requiring frequent maintenance. These units also are noisy and require sound proofing in the homes where they are installed.

It is an object of this invention to provide a Telemetry System capable of including a large number of remote stations which is of simplified construction.

Another object is to provide such a system which is composed principally of solid state components requiring little maintenance. Such a feature is of special importance at the site of the remote stations. It is also the aim of an invention to provide compact remote station units.

In accordance with a general form of the invention there is provided a Telemetry System for ascertaining at a control station conditions existing at plural remote stations, comprising an interrogation transmitter, a source of carrier frequency connected to the transmitter, means for modulating the carrier with two or more frequencies grouped to identify a respective remote station, a transceiver at each remote station for receiving the modulated carrier, means responsive to the modulating component of the carrier for transmitting a return signal from that station modulated to indicate a condition existing at the remote station, and means at the control station for receiving the return signal and detecting therefrom an indication of the signalled condition.

The invention will now be described by reference to a preferred embodiment thereof as illustrated in the accompanying drawings, in which.

Figure 1:
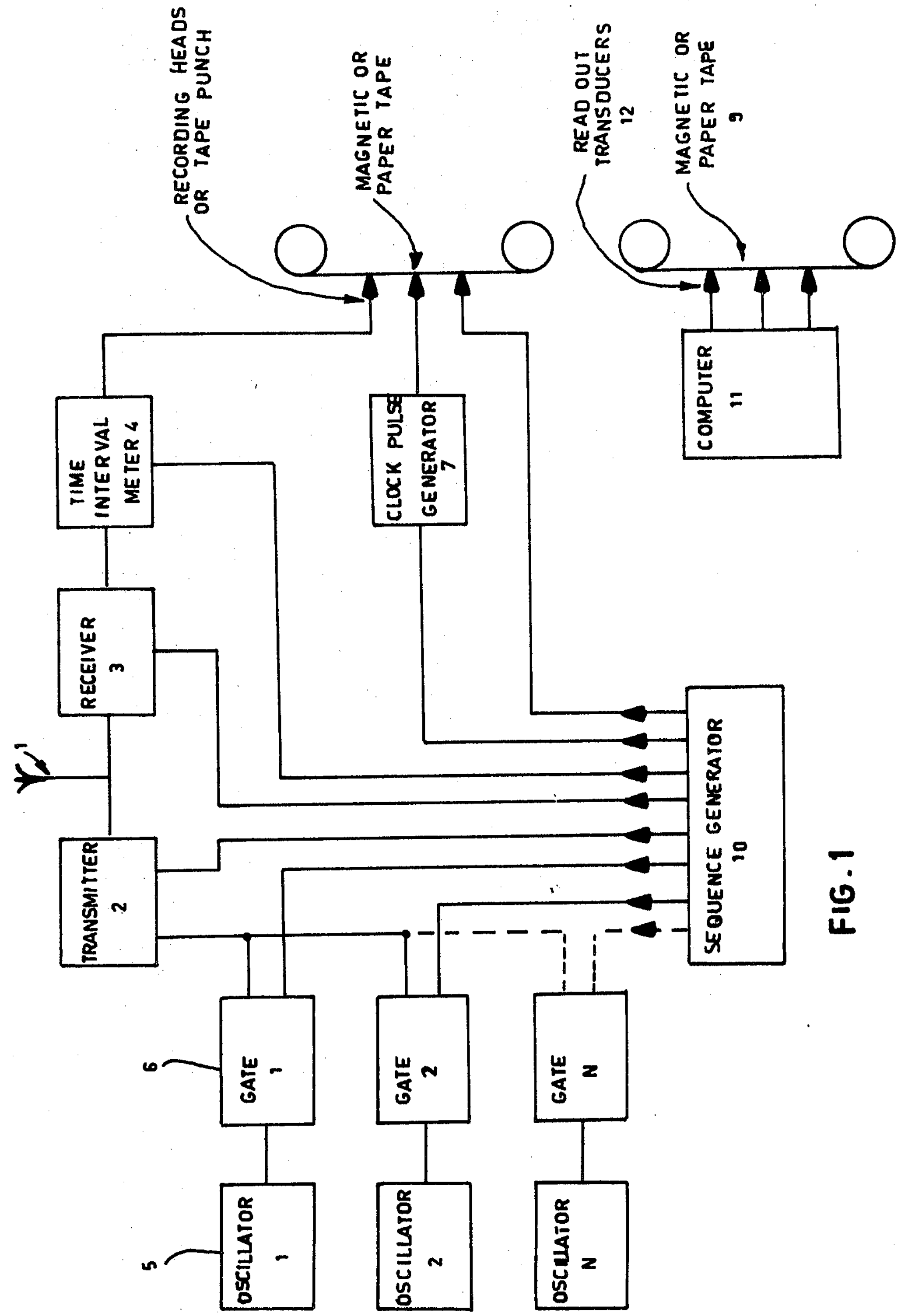
FIGS. 1 and 2 are diagrams of a central control station and a remote station, respectively, of a Telemetry System constructed according to this invention.

For the purposes of illustrating the Telemetry System of the invention in this embodiment it is applied to a Television Program Selection Analyzing System sometimes referred to as a Television Audience Survey System. With reference to FIG. 1, an aerial 1 is driven by a transmitter 2 which is modulated with three audio frequencies simultaneously. In one embodiment a total number of 15 audio oscillators 5 may be provided. The actual grouping of three selected audio frequencies serves as a means of identification of the remote stations of the system and this selection functions in a manner described hereafter for interrogation purposes of the remote stations.

If 15 audio oscillators are used there are a possible 455 different groupings available of three simultaneous frequencies. With this arrangement, therefore, a total 455 remote stations may be included in a single system, each of which is allocated an identifying group of three audio modulating frequencies. A sequence generator 10 is provided with a cycling function so that 455 different groups of gating pulses are generated and transmitted to the gates 6. The gates 6 to which the pulses are applied serve to switch the respective audio signals applied to transmitter 2.

Figure 2:
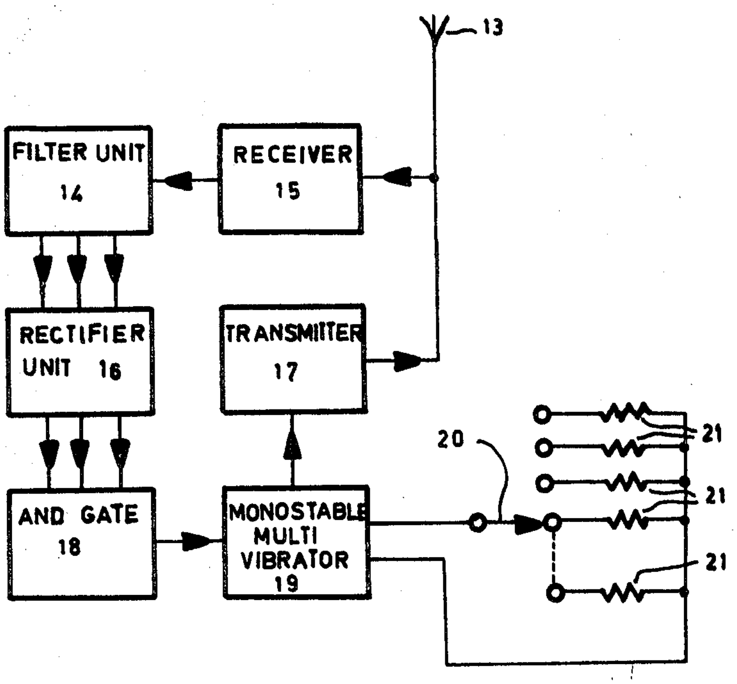

As shown in FIG. 2, the modulated RF interrogating signal is received by the aerials 13 at all remote stations and fed into respective receivers 15 thereat. An individual filter unit 14 is provided at each remote station to receive the demodulated signal from its receiver 15. A rectifier unit 16 is also provided at each remote station and accepts the outputs of its associated filter unit 14. Each filter unit 14 contains three separate filters each of which is tuned to one of the audio frequencies supplied by the oscillators 5 at the central control station.

Each time one of the modulating frequencies corresponds to a filter frequency at a remote station, the filter 14 passes this signal which is then rectified in the rectifier unit 16. The rectifier unit 16 then produces a voltage and feeds it to the three input AND 18. When the three modulating signals correspond to the three filter frequencies of a particular filter unit 14, all three signals are passed on to the rectifier unit 16. The AND gate 18 then receives a voltage on all of its inputs. It is only under these conditions that an output is transmitted from the AND gate 18. When this signal ceases a monostable multivibrator 19 is triggered and produces a pulse whose duration is variable depending upon the prevailing conditions which it is intended to signal back to the central station. The derived pulse enables a transmitter 17 to transmit a return RF signal of similar duration to the applied pulse via aerial 13 to the central station.

In the present application the conditions to be signalled is the selected position of the tuner switch on a commercial television receiver. A different value resistor 21 may be connected with each position of the tuner switch corresponding to a television channel tuning. The resistor 21 associated with the selected position of the tuner is connected as part of an RC network in the circuit of the multivibrator 19. The value of the connected resistor 21 can therefore control the duration of the pulse applied to transmitter 17. These resistors 21 may be mounted on a switch wafer which is added to the tuner switch. Instead of resistors 21, capacitors may be mounted on the switch wafer.

As an alternative to keying the transmitter 17 with a single pulse, the transmitter may be modulated with a sine wave or a square wave of which the frequency is a function of the prevailing condition to be signalled back, or with a pulse train whose duty cycle and/or frequency is a function of the prevailing condition. These alternatives are not entirely satisfactory, however, mainly because the efficiency of the transmitter is lower and the receiver 3 at the central control station requires a much larger bandwidth, both factors resulting in reduction of the operating range.

An alternative to fitting an additional wafer to the tuning switch is to employ several amplifiers, each one tuned to the local oscillator frequency of the television channels of interest. This signal is radiated in the television receiver and can be easily picked up. The amplifier receiving the signal may produce a voltage which will gate a resistor. This resistor forms a part of an RC network which determines the time of the pulse produced by the monostable multivibrator 19.

The return signal is received back at the central station through aerial 1 by the receiver 3 and applied to the input of a time interval meter 4, which measures the duration of the pulse which is representative of the channel to which the commercial television receiver is tuned.

The sequence generator 10 serves as a master control for the entire equipment at the central control station. As previously described, this generator 10 cycles and applies appropriate gating pulses to the audio oscillators 5, simultaneously it generates a signal identifying the outstation. It also gates the transmitter 2 and receiver 3 on and off in sequence. A trigger pulse is also applied from the sequence generator 10 to a clock pulse generator 7 to produce therefrom a signal representative of the time at that instant. The sequence generator 10 also resets the time interval meter 4.

A set of recording heads 8 associated with a magnetic storage tape 9 receive, respectively, the signals above-mentioned i.e. the signal representative of the tuned channel which originates from the time interval meter 4, the outstation identification signal from the sequence generator 10, and the time signal from the clock pulse generator 7. These three items of information may be stored upon the tape in appropriate digital form. Instead of recording heads and magnetic storage tape, a hole puncher and paper tape can be used. An additional voltage pulse is derived from the sequence generator 10 to reset the time interval meter 4.

It will be seen that through the use of the above described equipment each of the television receivers at the remote stations is interrogated once every minute, or other predetermined time period, and responds to indicate the channel to which the receiver is tuned at that instant. A complete record is, therefore, kept upon the storage tape of the tuning condition of each remote television receiver during a period when it is intended to carry out an analysis of public opinion to a particular television program. When it is required to effect a digest of the recorded statistics, the storage tape 9 or paper tape may be applied to readout transducers 12 and the relating information fed to a computer 11.

In cases where a large distance of difficult terrain has to be covered, local receiving stations can be used to collect the signals from the remote stations in that area. These signals may be demodulated at these receivers and then sent to the central control station through telephone cables.

In cases where an extremely large area, or several remotely spaced centers have to be covered, transmitting control stations may be used in respective centers. These transmitters will then preferably have to be gated and modulated by signals fed through land lines from a master control. Thus by the use of such remote transmitting stations and receiving stations a very large area can be covered. The limiting factor is the sampling rate. This is limited by the bandwidths of receivers, transmitters and land lines, and by cost.

A more detailed description of the system will now follow with reference to schematic circuitry in which the reader will readily recognize conventional components and their circuit connections. The description, therefore, will refer chiefly to the utilization of the circuits and their general functioning in the present system.

CENTRAL CONTROL STATION

Aerial, Transmitter and Receiver

The aerial 1, transmitter 2 and receiver 3 are preferably installed at a base station of the kind commonly used at present for radio-telephone control centers, or two-way radios similar to those employed by taxicab services and the like. A typical station is that commercially marketed as the Pye 5VA528, the microphone socket of which may be used to feed in modulating frequencies. The gain of the microphone amplifier is preferably reduced to minimize noise, hum and interference.

Figure 3A:
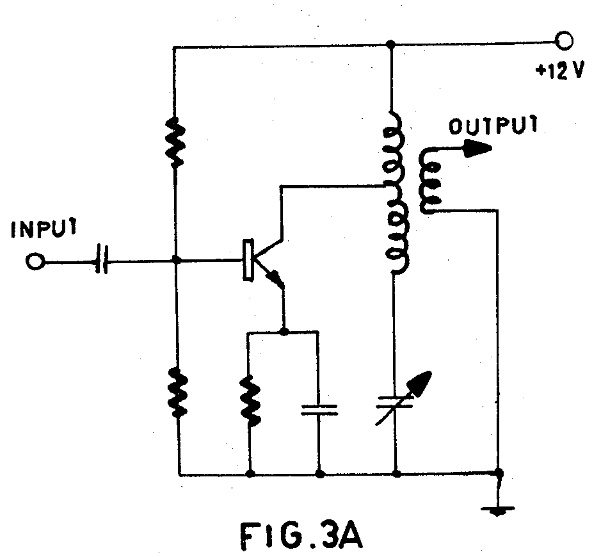
FIGS. 3A and 3B are schematic diagrams of typical doublers or triplers, and the same unit with an added enabling gate, respectively for enabling the transmitter of FIG. 1.
Figure 3B:
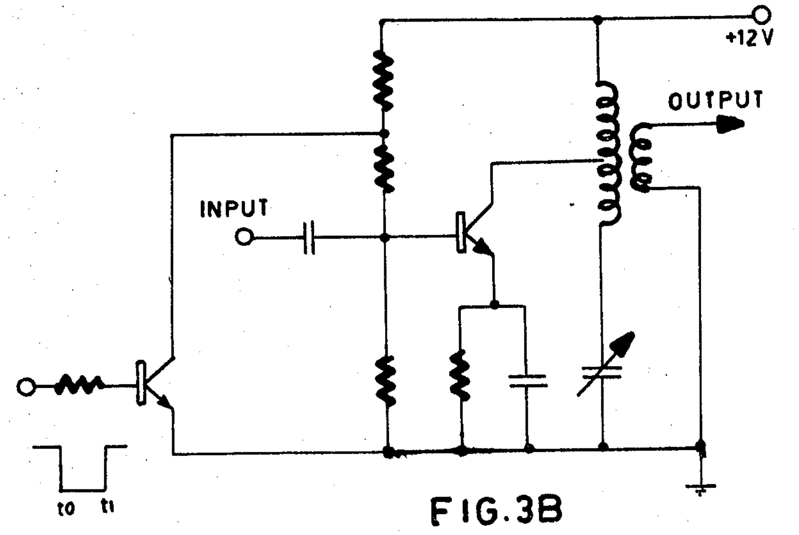
Figure 8:
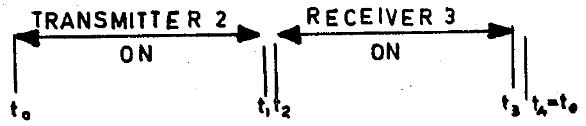
FIG. 8 is a timing diagram showing the relative time spacing between operations of the transmitter and receiver at the central control station.

Sampling of the tuning conditions at their remote stations is performed cyclically once from each remote station during a predetermined time interval. The time interval is divided into time parts or slots during part of each of which the transmitter 2 is switched on and for the remaining part is switched off. Representation of timing during a single time slot is shown in FIG. 8 where for part ($t_0$–$t_1$) of the time the transmitter 2 is transmitting and for part ($t_2$–$t_3$) of the time the receiver 3 is receiving. FIGS. 3A and 3B show a frequency doubler or tripler, bias for which may be gated for conveniently enabling the transmitter 2. A similar arrangement may be used at the remote station for the transmitter 17 thereat.

The aerial switch must be fast acting so that it is advisable to replace the conventional electromechanical relay by reed relays or electronic switches.

A.F. Oscillators 5 and Gates 6

Figure 4:
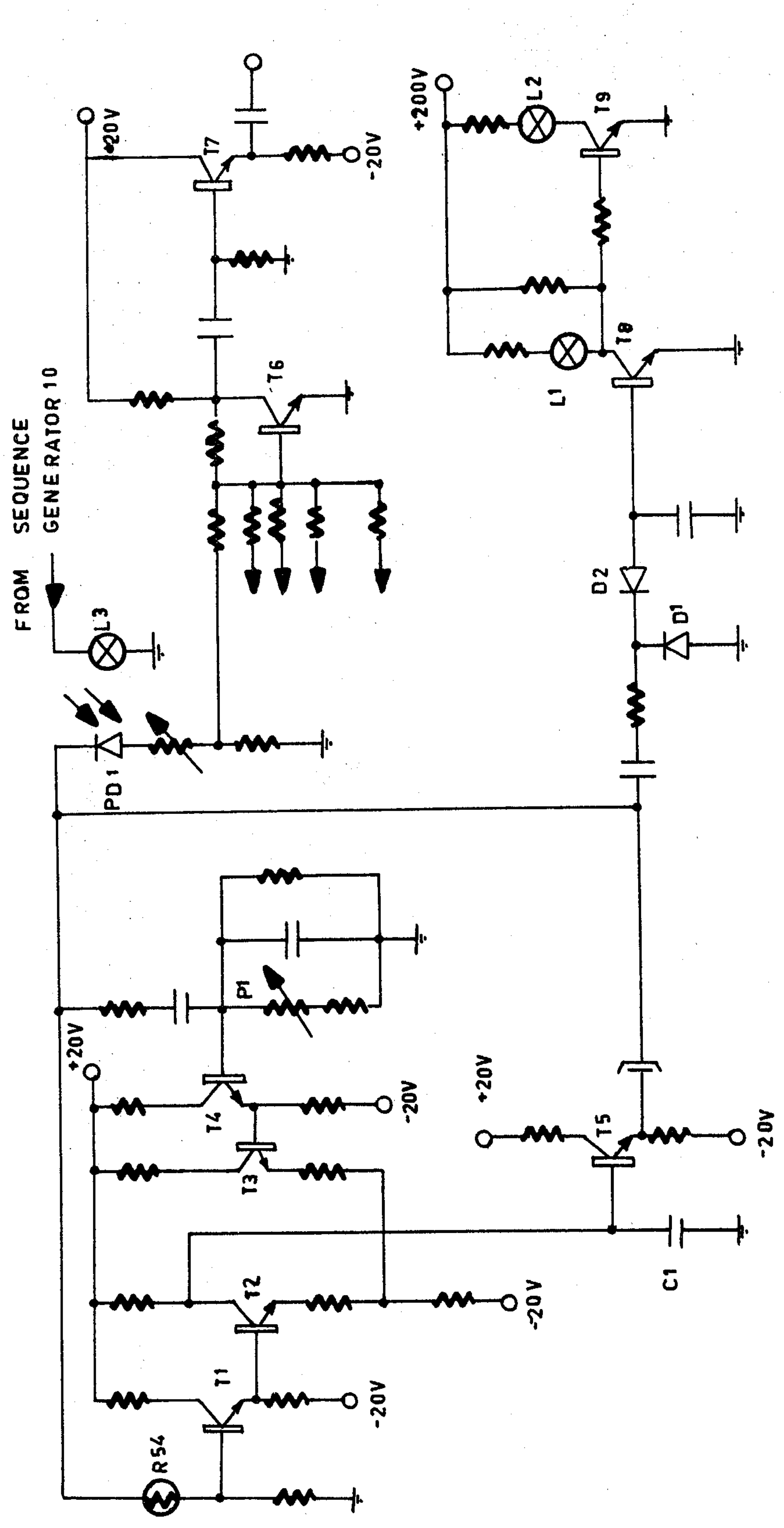
FIG. 4 is a schematic diagram of a suitable audio frequency oscillator and switching gate for use with the system.

Reference will be made to FIG. 4 and the oscillators illustrated are of the Wien Bridge type. The amplitude is stabilized by a thermistor R54 and the frequency is made stable by the use of metal film resistors and mylar capacitors and by the use of emitter followers T1 and T4 so that the bridge is virtually unloaded. A preset potentiometer P1 provides adjustment over a very small range. As a typical example the oscillator shown may provide a frequency of 1,000 c/s. Basically the amplifier shown consists of a long tailed pair differential amplifier followed by an emitter follower. A small capacitor C1 prevents spurious oscillation.

When the oscillator operates normally a rectifier network D1, D2 provides a DC voltage to the base of a high voltage transistor T8. This transistor then conducts so that a lamp L1 with a green bezel illuminates to indicate that the oscillator is operating. If the oscillator fails the diode T8 stops conducting. A small current then flows through the base of the high voltage transistor T9 so that this transistor conducts and a neon lamp L2 with a red bezel warns that the oscillator has failed. The frequencies used depend upon how many oscillators are required.

One suitable form of gating is shown in the circuit diagram. A signal applied from the sequence generator 10 illuminates a neon light L3 which activates a photo diode PD1, the resistance of which then changes from very high to very low to pass the audio tone from the oscillator on to the adder T6. This adder T6 adds the three audio tones which have been selected and an emitter follower T7 provides a low output impedance.

Time Interval Meter 4

Figure 6:
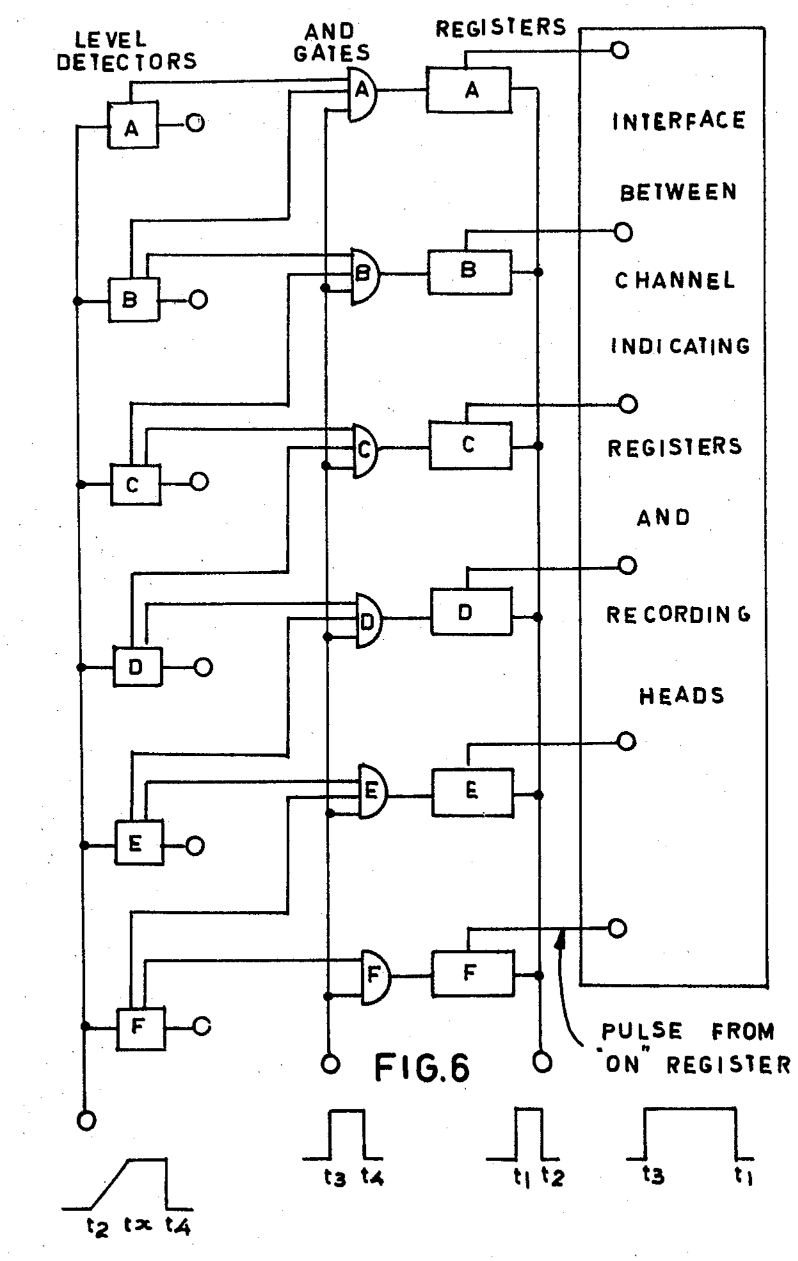
FIG. 6 is a schematic diagram of further circuitry associated with this meter.
Figure 7:
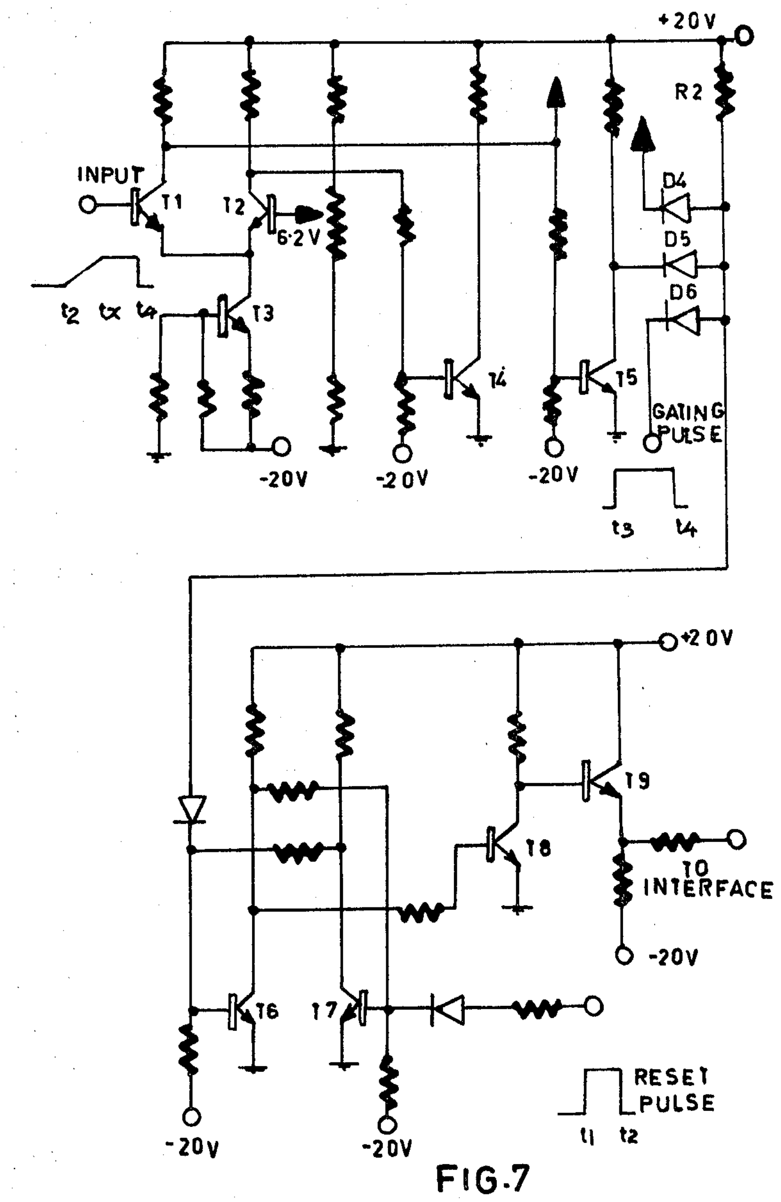
FIG. 7 is a schematic diagram of further circuitry forming part of the time interval meter.

The time interval meter 4 measures the duration of the pulses transmitted from the remote stations. A conventional manner of measuring this time would be to gate an oscillator with the pulses and count the cycles. For example, if a 50 millisecond pulse gates a 10 kc./s. oscillator, the number of cycles produced is 500±1. This system is used in most modern time interval meters and consequently requires no further description. An alternative form, however, also suitable for the required purpose is illustrated by FIGS. 5 to 7.

Figure 5:
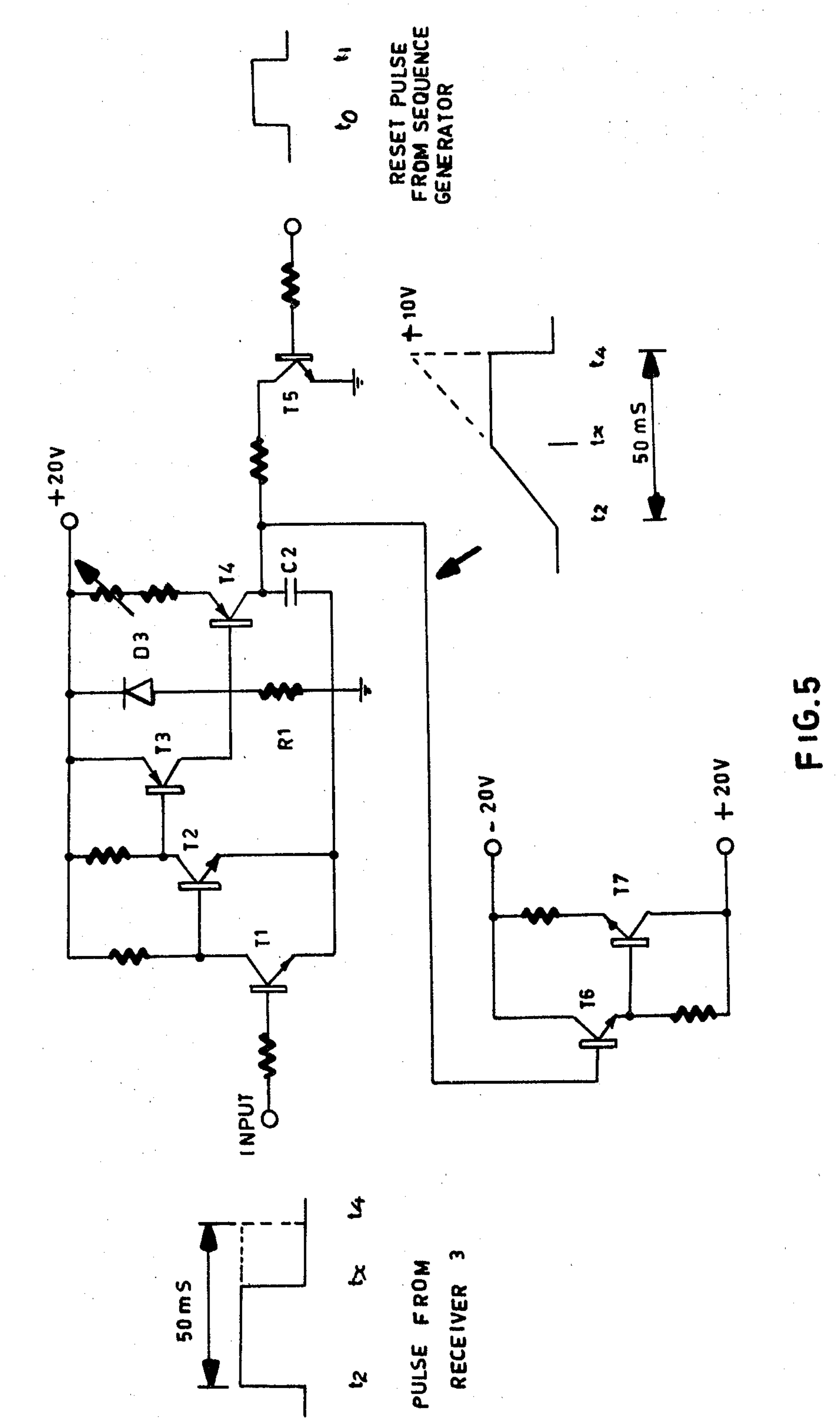
FIG. 5 is a schematic diagram of circuitry forming part of a time interval meter of the invention.

FIG. 5 illustrates the electrical circuitry of a time voltage converter. Let it be assumed that the capacitor C2 is discharged. When the voltage from the receiver 3 becomes positive the transistor T1 conducts causing the voltage across it to drop almost to zero. This causes the transistor T2 to become nonconductive. As the base to emitter voltage of the (PNP) transistor T3 is then zero this transistor is therefore also nonconductive A current flows through the zener diode D3 and resistor R1 so that the voltage on the base of (PNP) transistor T4 is kept constant resulting in steady current through the transistor T4 and capacitor C2 so that the voltage across it increases in linear fashion.

When the input pulse has terminated, the transistor T3 starts conducting, shorting the zener diode D1 and rendering the transistor T4 nonconductive The voltage across capacitor C2 then stops increasing and remains at a fixed level until 50 milliseconds after the start of the input pulse. A reset pulse made the transistor T5 conduct, so that capacitor C2 is rapidly discharged. The transistors T6 and T7 are connected as emitter followers, providing a very high input impedance, so that capacitor C2 is not loaded, and also provides a very low output impedance.

The gain is exactly unity and by using a combination of one PNP and one NPN type transistors the zero level is not shifted. The output voltage from the transistor T7 is applied as a voltage to a channel indicator converter which will be described with the aid of block diagram FIG. 6.

Assume that the program channels for monitoring are channels A, B, C, D, E and F, corresponding to the duration of the received pulses of 4, 12, 16, 32, 40 and 44 milliseconds, respectively, which correspond to a voltage of 0.8 v., 2.4 v., 3.2 v., 6.4 v., 8v and 8.8 v. The output from the level detector A is normally low. If, however, the input voltage increases to above 0.6 v., the output becomes high. If the voltage does not increase above 2.2 v., the gate A is supplied with two positive signals when the input signal increases above 0.6 v. and at the time $t_3$, a third positive pulse is fed into the gate so that a bistable flip-flop A, acting as a register is set and the output reads channel A.

If, however, the input voltage increases to above 2.2 v., the AND gate B is fed with a high level signal from B and a high level signal from C. Should the input voltage not increase beyond 3v, at the time $t_3$, a third pulse will be applied to the gate B so that it passes a pulse and sets the register B to the gate B. The register that is set is reset at the time $t_1$.

During the time $t_3$ to $t_1$ a pulse is passed into the interface between the registers and the recording heads. The design of this interface depends entirely on the recorder that is used. Often, at least part of the interface is supplied with the recorder. The interface may contain a matrix to convert the channel number into a suitable binary figure.

With reference to FIG. 7, the circuit of the voltage to channel indicator converter consists of a long tailed pair differential amplifier containing transistors T1, T2, and T3, two amplifiers (transistors T4 and T5), an AND gate consisting of three diodes D4, D5 and D6 and one resistor R2, a bistable multivibrator (transistors T6 and T7) and an amplifier with a low output impedance (transistors T8 and T9). The circuit is of straightforward design and should not require detailed description.

Clock Pulse Generator 7

Clock pulse generators are generally synchronized by the mains frequency. The frequency of the 50 c/s supply is first changed into a square wave by a Schmitt trigger. The resulting square wave is electronically divided by 50 to produce one pulse every second. This frequency is then divided by 60 to produce one pulse every minute, the resulting frequency is again divided by 60 to produce one pulse every hour. The second, minute and hour signals usually are in binary form and are fed to registers upon reception of a gating pulse, between the times $t_3$ and $t_4$.

The design of the interface between the registers and recording heads depend upon which recording system is used. The registers are reset at the time $t_1$, so that the time signal is fed to the interface between the times $t_3$ and $t_1$. Clock pulse generators are readily available, either complete or in module form, and no detailed description will be given.

Sequence Generator 10

One suitable form of sequence generator for the system will be described with reference to FIGS. 9, 10, 11, 12, 13 and 14.

Figure 9:
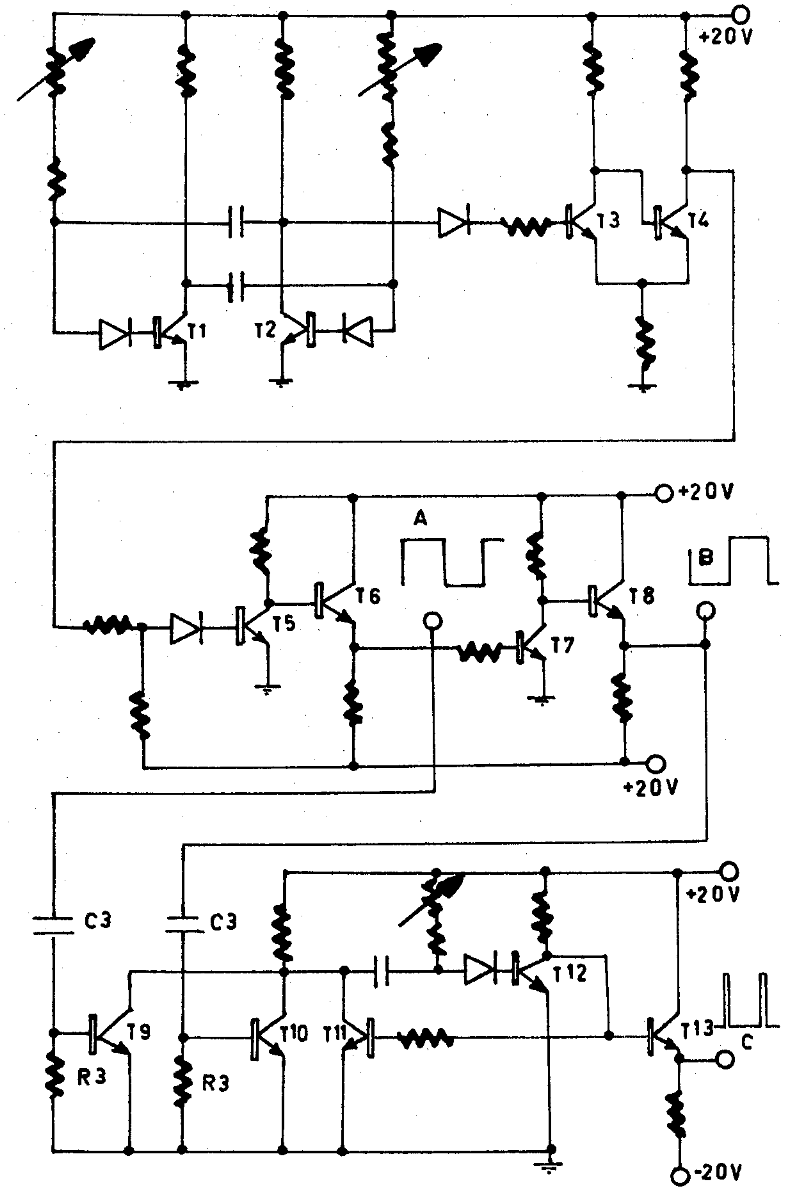

In FIG. 9, transistors T1 and T2 are part of an astable multivibrator producing a square wave, which is properly shaped in the Schmitt trigger (transistors T3 and T4). Transistors T5 and T6 are part of an amplifier circuit in which the transistor T6 is connected as an emitter follower, providing a low output impedance. The resulting square wave is shown at this part of the circuit and labeled A. (See also FIGS. 10 and 11). The square wave A is fed into an amplifier (transistor T7 and T8), which produces an identical square wave B, but of opposite polarity.

Each wave form is differentiated in an RC network consisting of a respective capacitor C3 and resistor R3. The result is that the positive going edge of each square wave A and B make the trigger transistors T9 and T10 conduct momentarily. The monostable multivibrator (transistor T11 and T12) therefore produces pulses of twice the repetition frequency of either square wave, (see wave C). The transistor T13 is connected as an emitter follower to provide a low output impedance.

Figure 10:
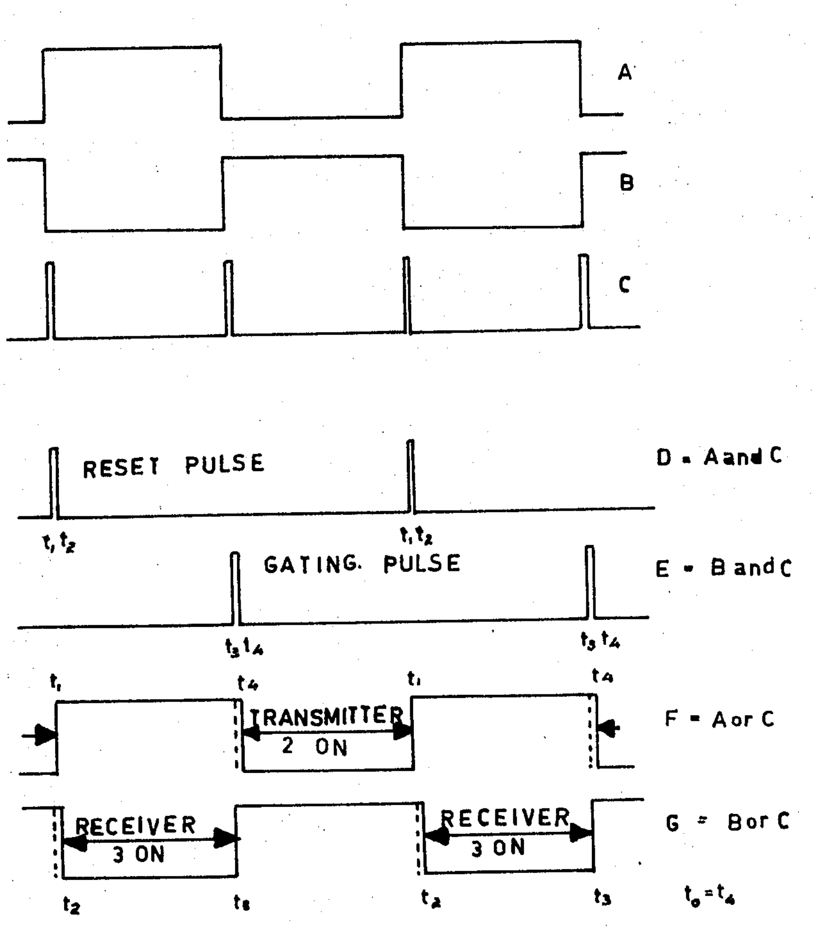

From FIG. 10, it can be seen that if the signal waves A and C are applied to an AND gate, the result will be a signal D, which is used as a reset pulse in the time interval meter (FIG. 6 and FIG. 7). If the signals B and C are applied to an AND gate, the result will be a signal E, which is used as a gating pulse in the timer interval meter (FIG. 6 and FIG. 7). If, however, the signals A and C are fed into an OR gate the result will be a signal F, which in this or an inverted form can be used to gate the transmitter 2. Finally, should the signals B AND C be fed into an OR gate, the result will be a signal G, which signal in this or inverted form can be used to gate the receiver 3. The inverted signal F is also used as a reset pulse (see FIG. 5).

Figure 11:
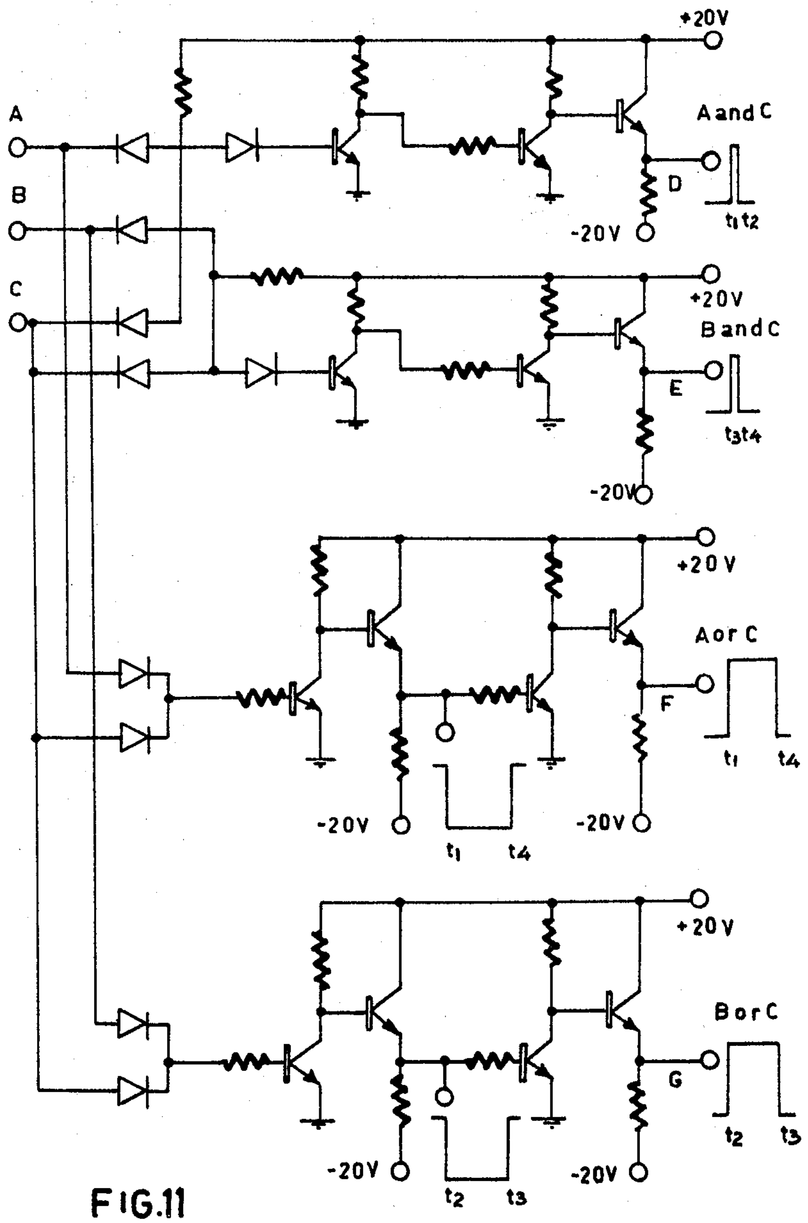

All these signals may be produced in a circuit such as shown in FIG. 11, the operation of which should be self-explanatory from the circuit details shown.

Figure 12:
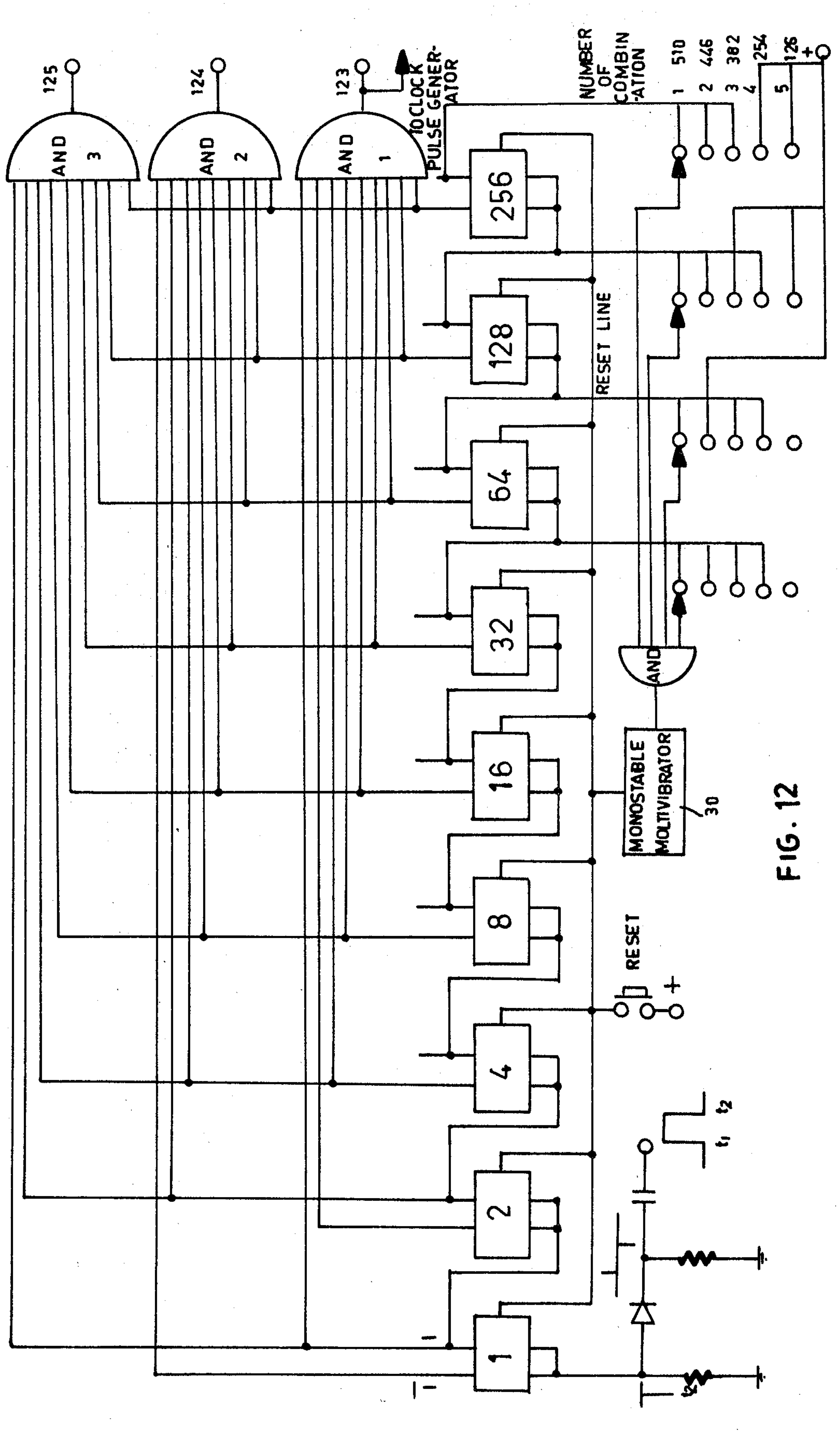

FIG. 12 shows the signal F as being differentiated in a simple RC circuit, and that the negative going edge at the time $t_4$ ($=t_o$) toggles the multivibrator 1. The next negative going pulse at the time $t_4$ returns the bistable multivibrator 1 to its original state, but in doing so toggles the multivibrator 2 etc. With the switch in position 1, the AND circuit passes a signal when all bistable multivibrators have changed states. A monostable multivibrator 30 then produces a short reset pulse. The last count cannot be used because its duration is different from the duration of the others, due to the use of the monostable multivibrator 30. The maximum count then is: 1+2+4+8+16+32+64+*a*128+256−1=510.

When the switch is in the second position the count of the 64 counting multivibrators is ignored as far as the reset pulse is concerned. The system resets then when all except the 64 counting multivibrators have reset. The total count is then 1+2+4+8+16+32+64+128+256−1=446 etc.

When the multivibrator 1 has changed states, but no other, the AND gate 1 passes a current. When the multivibrator 2 has changed states, but no other, the AND gate 2 passes a current. When the multivibrators 1 and 2 both have changed states, but no other, the AND gate 3 passes a current. Although only three AND gates for this purpose have been drawn, it should be borne in mind that there could be as many as 510.

Figures 13, 15:
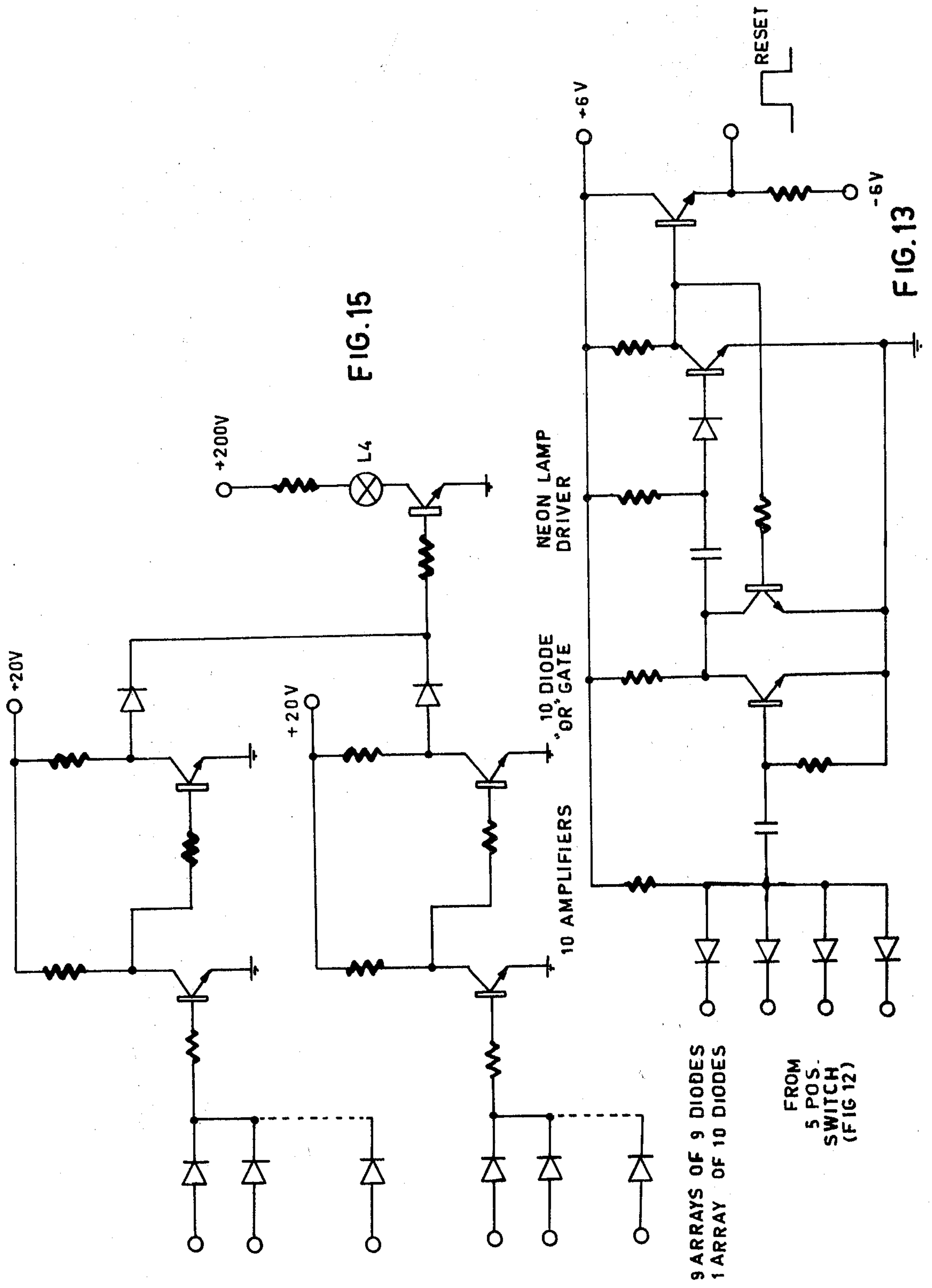

A reset button is used to reset the system shortly after switching on, when the states of the multivibrators are uncertain. FIG. 13 shows the reset AND gate and an astable multivibrator that produces the reset pulse. The multivibrators are integrated circuits; a suitable one is that marketed as the Philips Miniwatt FCJ101. The AND gates all consist of 9 diodes and 1 resistor.

Figure 14:
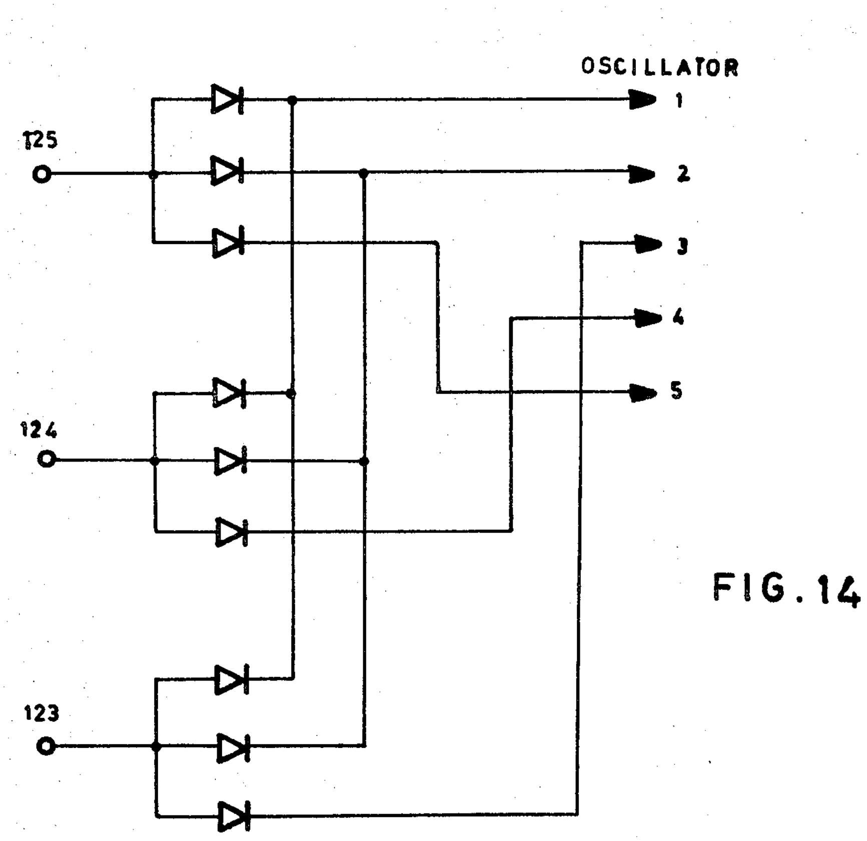
FIGS. 9 to 15 are schematic diagrams and pulse sequence diagrams to illustrate a sequence generator for use with the system.

FIG. 14 shows part of the OR gates 6 that gate the oscillators 5. At the first count, oscillators 1, 2 and 3 are gated. In one complete sequence then, the first count involving oscillator 1, is 1.2.3, and the last count is 1.14.15, assuming there are 15 oscillators. It can be calculated that there are 13+12+11+10+9+8+7+6+5+4+3+2+1=91 times, the oscillator 1 is gated in a sequence and that there are 12+11+10+9+8+7+6+5+4+3+2+1=78 times that the oscillator 2 is gated in a sequence; etc.

FIG. 15 shows part of the circuitry that gates oscillator 1. Rather than connecting 91 diodes to the oscillator 1 gating system, the 91 diodes are made into 10 OR gates, 9 consisting of 9 diodes and one consisting of 10 diodes. The output of each OR gate is fed into an amplifier, and the output of each amplifier is fed into an OR gate that actuates the neon lamp driver L4. When the neon lamp L4 is lit, a photosensor passes the output of oscillator 1 to the transmitter 2. It is convenient to feed the output of one of the gates to the clock pulse generator 7.

Aerial 13

The type of aerial 13 used for the receivers 15 and transmitters 17 for the remote stations depends upon the terrain and distance from the aerial 1 and/or the distance from a receiver station, if used. In many cases the existing household television antenna can be used. Alternatively, a simple dipole may be used.

Receiver 15, Filter Unit 14, Rectifier 16, AND Gate 18 and Monostable Multivibrator 19.

The receiver 15 has a crystal controlled oscillator, and is of a conventional design.

Figure 16:
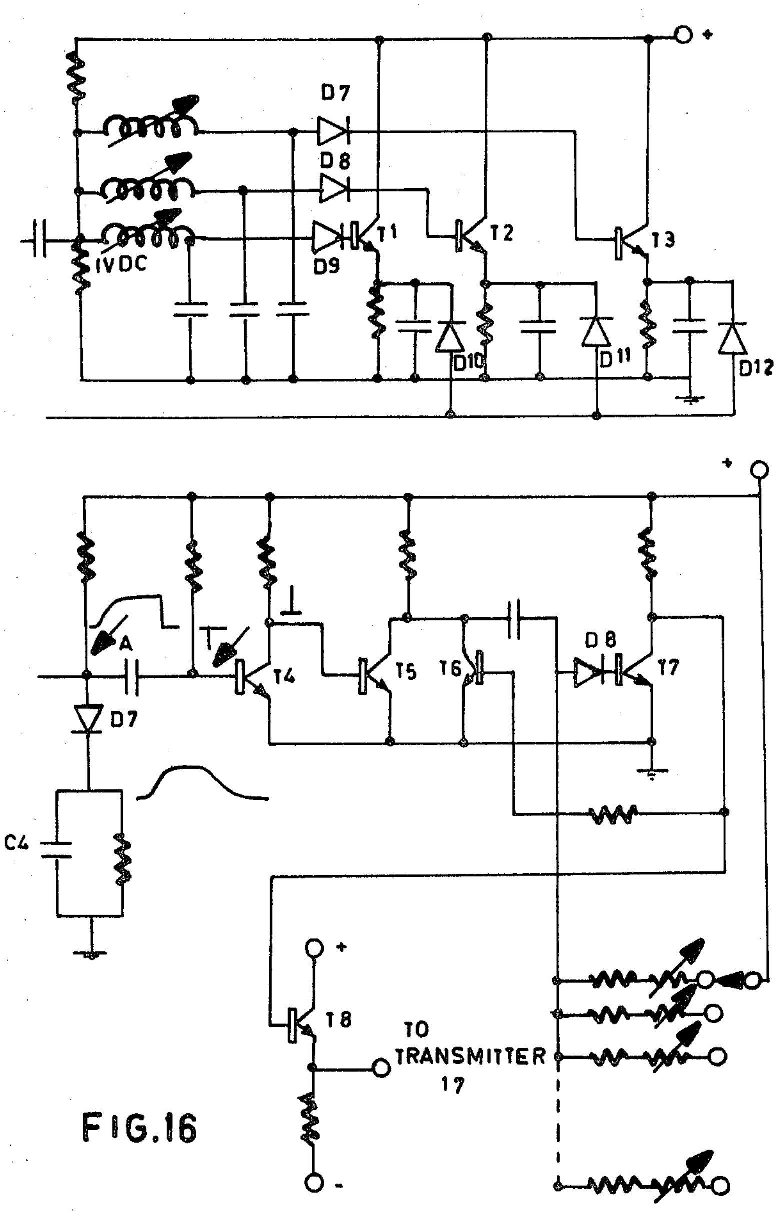
FIG. 16 shows one form of a filter unit combined with a rectifier unit AND gate and monostable multivibrator for use with the above system.

The other circuits are shown in FIG. 16 in which each filter unit 14 contains three filters. Instead of diode rectifiers, transistors (T1, T2 and T3) may be used, so that the filters are lightly loaded. The diodes D7, D8 and D9 prevent reverse base-emitter breakdown. The diodes D10, D11 and D12 are part of the AND gate. When the receiver passes on the three required tones, the voltage at A rises slowly, due to the fact that capacitor C4 is charged. When one tone disappears the voltage decays abruptly. The slow rise of the signal prevents the unit from operating on a short spurious signal.

An RC network differentiates the abrupt fall. The resulting negative "spike" is inverted and applied to the trigger transistor T5 of the monostable multivibrator 19. The output is applied to the transmitter 17 via the emitter follower (transistor T8).

Transmitter 17

A conventional transmitter may be used such as in which the first stage is a crystal controlled oscillator, the second stage the driver and the last stage the output stage. A gating pulse from the monostable multivibrator may enable the driver stage.

The above detailed description illustrates several suitable equipment units which may be employed to provide the desired function as outlined in the general description of the system referenced to FIGS. 1 and 2. It should be understood that these units are only exemplary of the actual components which may be employed.

The power switch for the wave signal receivers may also control the connection of power to the signalling unit at the location. Thus the absence of a return signal from the remote station will indicate that the receiver is not in use by the householders.

What I claim is:

1. An Audience Survey System comprising a central control and remote signalling units connected with household wave signal receivers tuned to programs, a transmitter at the central control, means for activating the transmitter during a first part of every time slot in a repetitive cycle of time slots to transmit an interrogation signal composed of a carrier modulated to identify in each time slot a respective one of the remote signalling units, means at each remote signalling unit to receive the interrogation signals and to respond thereto with a reply signal during a second part of the respective time slot when that signalling unit corresponds with the modulated identification conveyed by the interrogation signal, a transmitter at each of the remote signalling units, 2. An Audience Survey System according to claim 1, wherein the central control comprises a plurality of audio tone oscillators, gating devices connecting the oscillators to the central control transmitter for modulating the carrier signal, and a cycling generator connected to the gating devices to open successively predetermined groupings of the gating devices whereby an individual group of three audio tones are simultaneously applied to the transmitter in each time slot to provide said identification modulation of the carrier.

3. An Audience Survey System according to claim 2, wherein a triple track recording medium is provided at the central control to receive three groups of signals indicating, respectively, the time, identification of the remote station, and the condition signalled from the remote station, whenever a reply signal is received.

4. An Audience Survey System according to claim 1, wherein said circuit is an RC network.